June 19, 1962 N. T. SAWDEY 3,039,181
APPARATUS FOR ASSEMBLYING THREADED MEMBERS
Filed July 15, 1959 8 Sheets-Sheet 1

INVENTOR.
Neil T. Sawdey,
BY
John H. Leonard,
his ATTORNEY.

June 19, 1962  N. T. SAWDEY  3,039,181
APPARATUS FOR ASSEMBLYING THREADED MEMBERS
Filed July 15, 1959  8 Sheets-Sheet 2
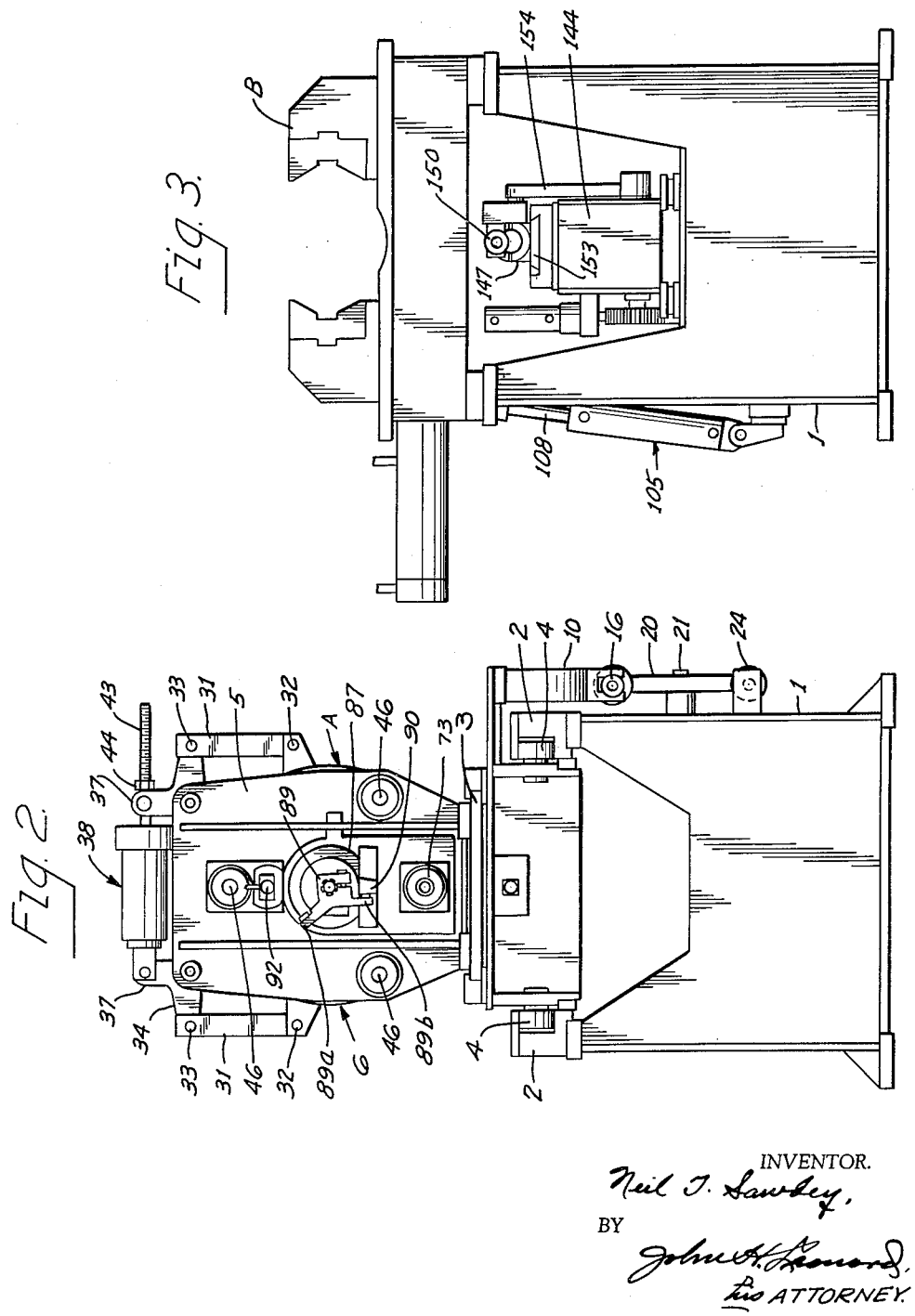
INVENTOR.
Neil T. Sawdey,
BY
John H. Leonard
His ATTORNEY.

June 19, 1962 N. T. SAWDEY 3,039,181
APPARATUS FOR ASSEMBLYING THREADED MEMBERS
Filed July 15, 1959 8 Sheets-Sheet 3
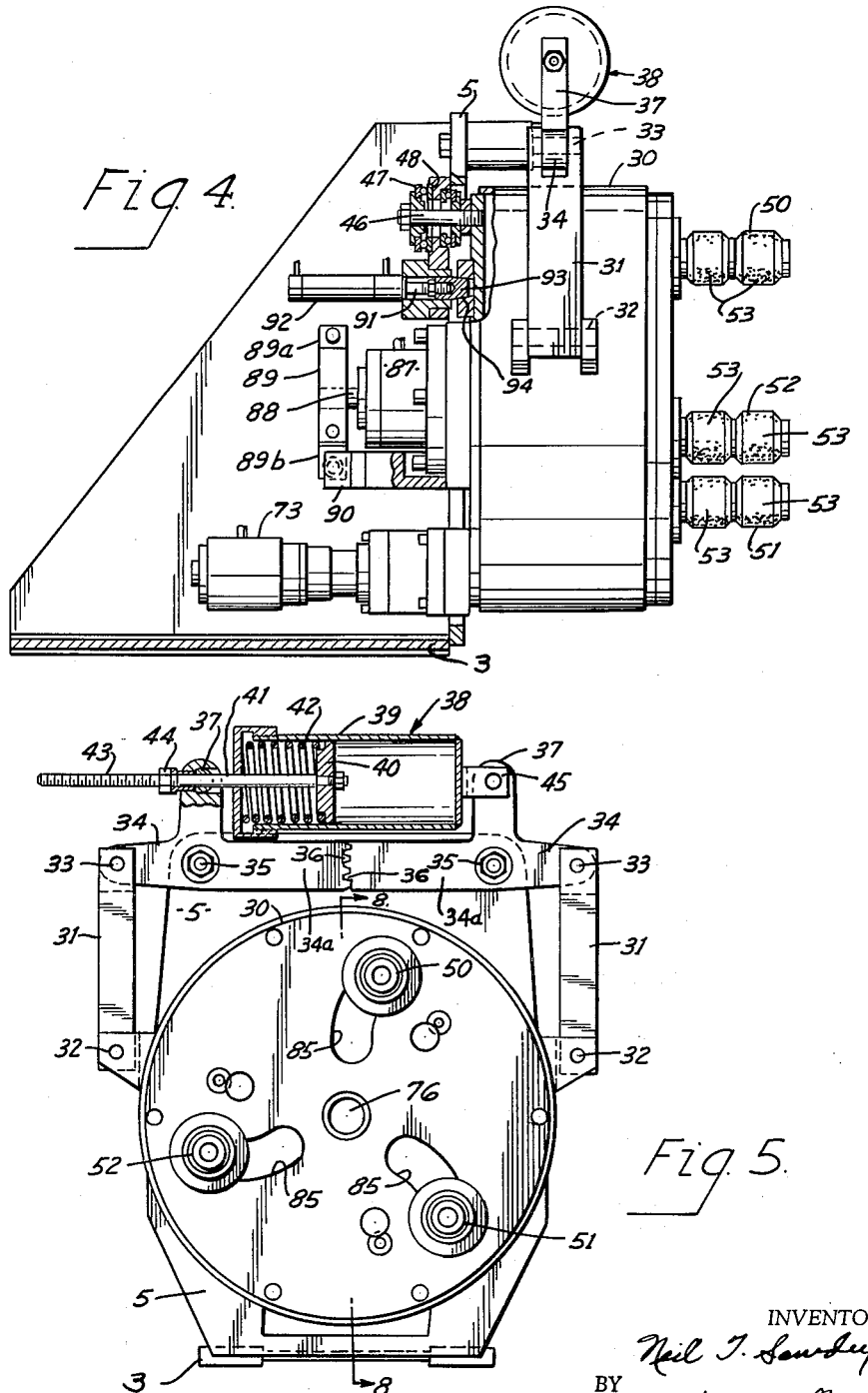
INVENTOR.
Neil T. Sawdey,
BY
his ATTORNEY.

June 19, 1962 N. T. SAWDEY 3,039,181
APPARATUS FOR ASSEMBLING THREADED MEMBERS
Filed July 15, 1959 8 Sheets-Sheet 4

INVENTOR.
Neil T. Sawdey,
BY
ATTORNEY.

INVENTOR.
Neil T. Sawdey

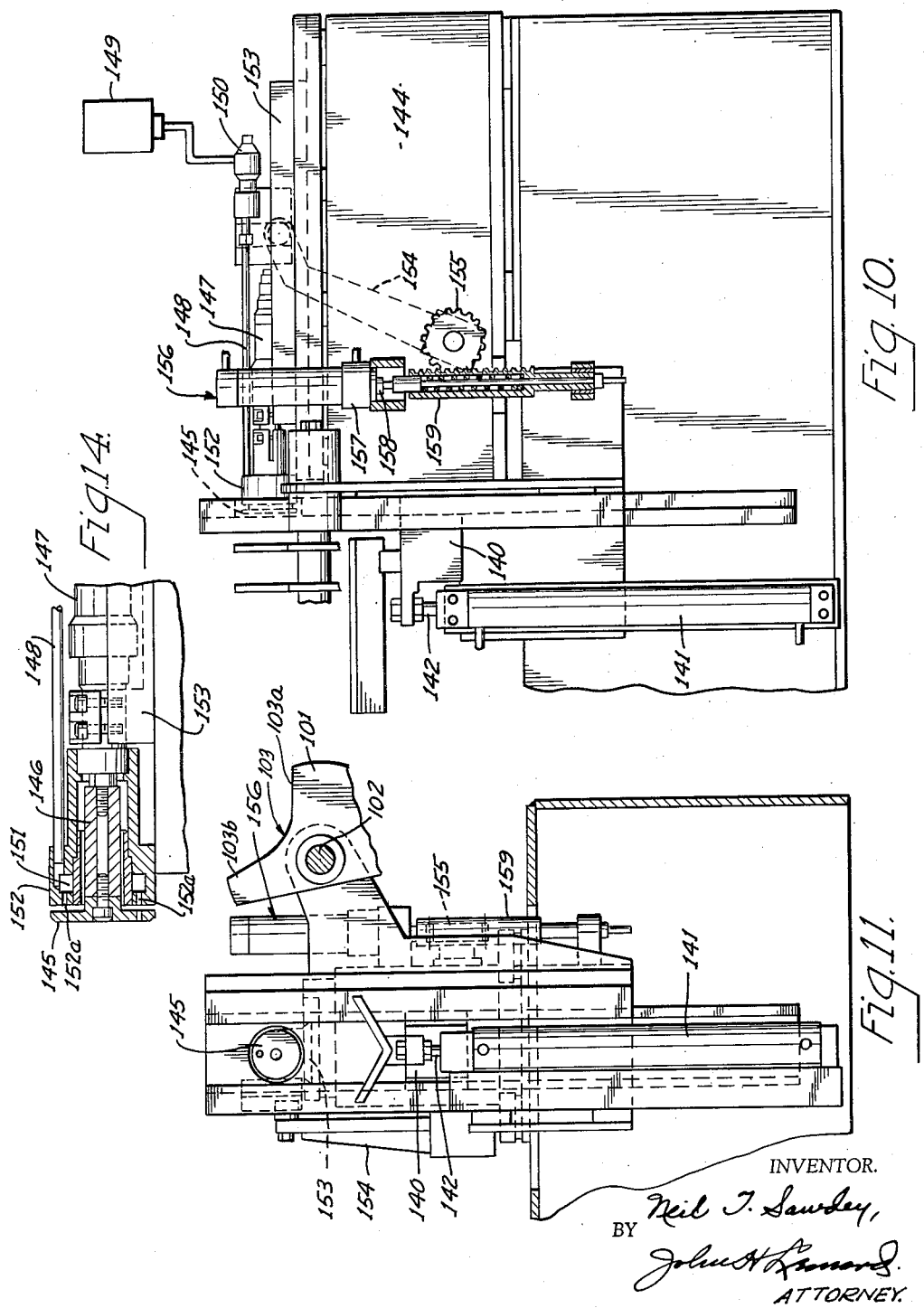

June 19, 1962 N. T. SAWDEY 3,039,181
APPARATUS FOR ASSEMBLYING THREADED MEMBERS
Filed July 15, 1959 8 Sheets-Sheet 7
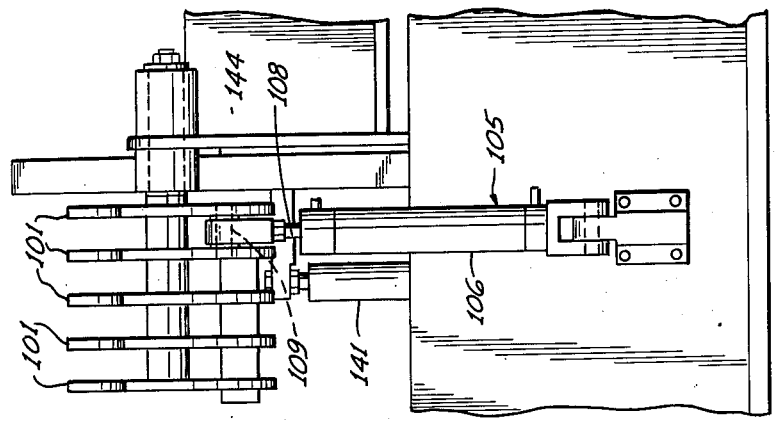
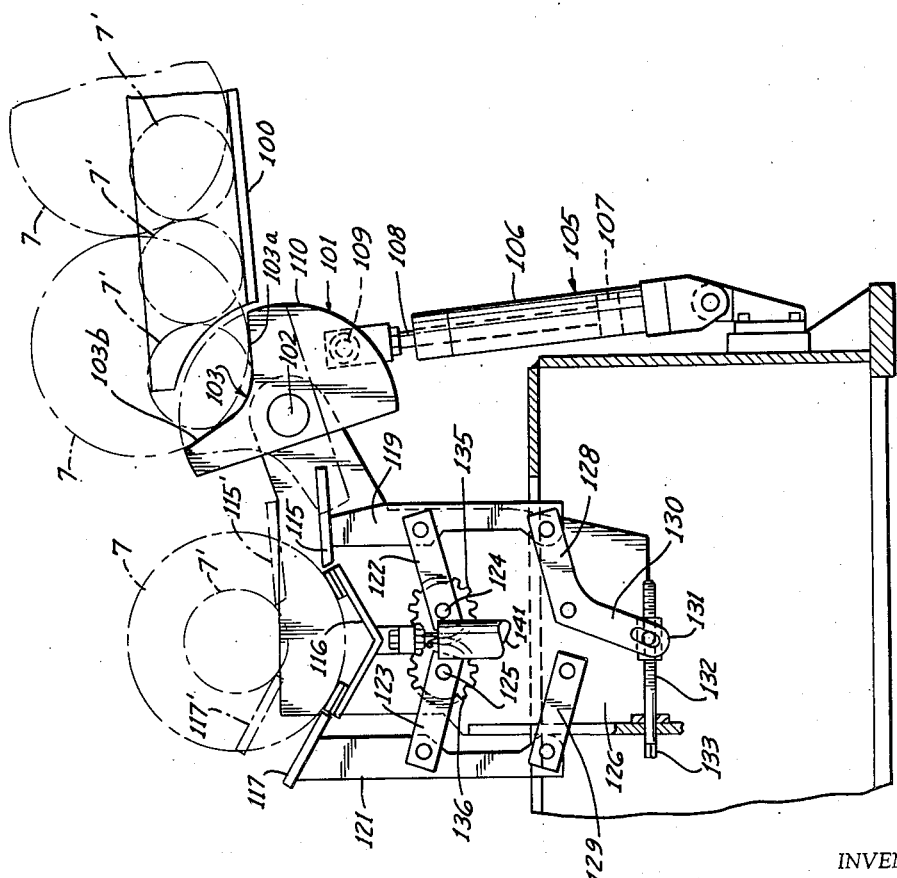
INVENTOR.
Neil T. Sawdey,
BY
John H. Leonard,
his ATTORNEY.

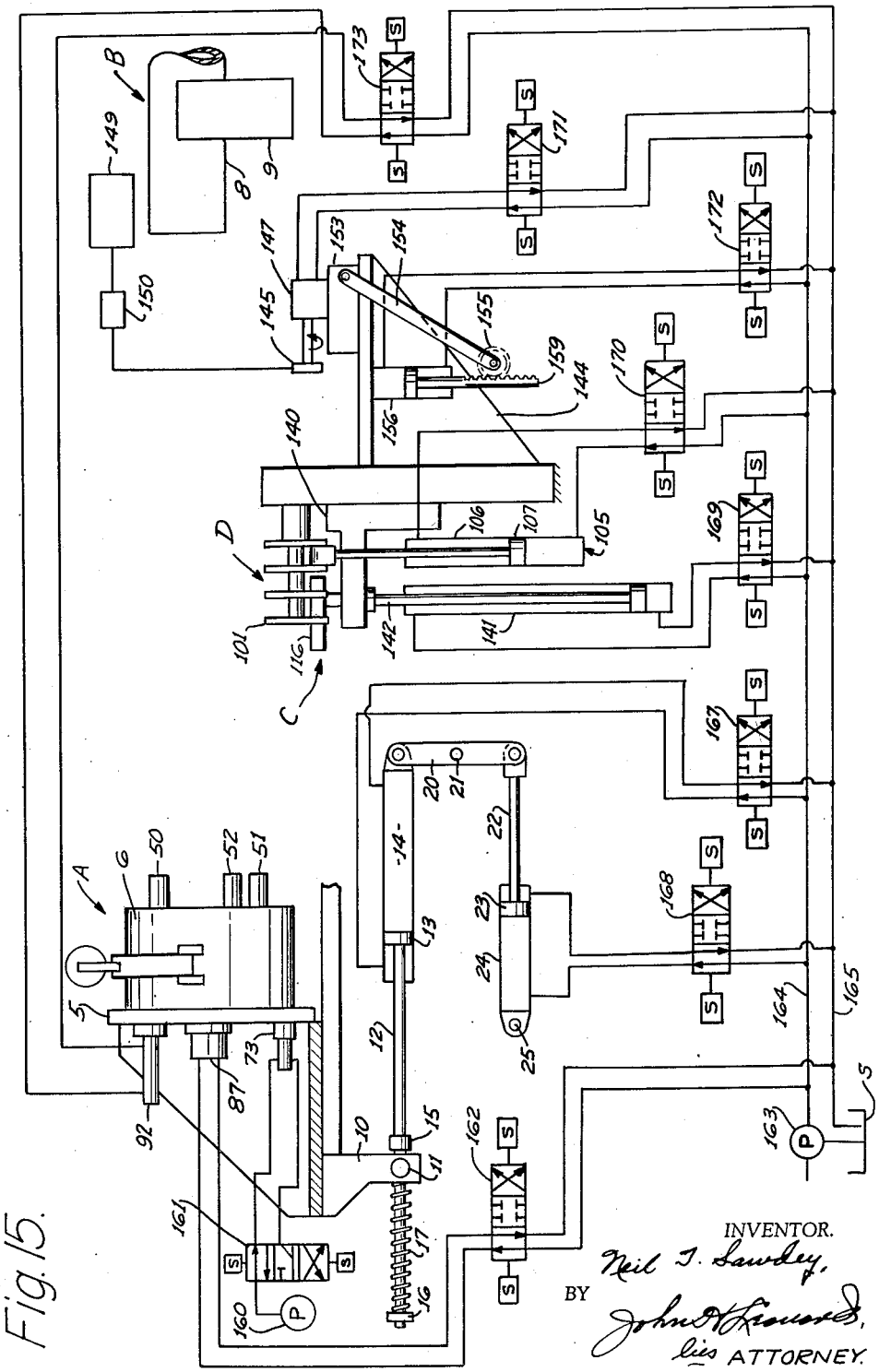

United States Patent Office 3,039,181
Patented June 19, 1962

3,039,181
APPARATUS FOR ASSEMBLING
THREADED MEMBERS
Neil T. Sawdey, Euclid, Ohio, assignor to The Pipe Machinery Company, Wickliffe, Ohio, a corporation of Ohio
Filed July 15, 1959, Ser. No. 827,229
11 Claims. (Cl. 29—237)

This invention relates to an apparatus for connecting threaded members and particularly to an apparatus for connecting threaded members of relatively large diameters.

For purposes of illustration, the apparatus is disclosed as applied to connecting threaded pipe couplings to the threaded ends of pipes, its application to other threaded members being apparent from the illustrative example.

Heretofore, threaded members have been connected together by clamping them in coaxial relation in chucks, one of which is rotatable about the common axis, and while rotating the latter, advancing the chucks relatively toward each other thereby to screw the members together. While such arrangements are satisfactory for threaded members of small diameter for which light weight chucks can be used, when an attempt is made to employ a like arrangement for threaded members of great weight or of large diameter, a number of difficulties are encountered. One difficulty is that the large rotatable chucks required create large inertial forces which resist starting and stopping. In the case of pipes and couplings, it is desirable to join the pipes and couplings at the manufacturing site consistently without jamming the threads and with a preselected degree of snugness. The inertial forces imposed by heavy rotary chucks operating at relatively high speeds render this operation difficult to control. As the size of the rotary chucks is increased, the sizes and weights of all of the operating mechanisms for expanding and contracting the jaws increase rapidly in proportion. As these must rotate with the chucks, the inertial forces are greatly multiplied. As a result, the torque applied to the threaded members cannot be readily controlled at the desired speeds of assembly so as to assure just the degree of snugness of fit required.

Furthermore, aside from weight, large diameters necessarily increase the torque for a given angular velocity. Another difficulty with prior rotary chucks is that the feeding of the workpiece into position to be grasped by the chuck is interfered with by the rotated position of the jaws unless the chuck stops in preselected rotated positions, and stopping a large chuck exactly in a preselected position in each instance is difficult and requires expensive equipment.

The present invention relates principally to a new and improved apparatus for applying one threaded member to another, and particularly to a new and improved chuck for applying threaded, large diameter pipe couplings to the threaded ends of pipes. Further, the invention is directed to the combination of a chuck and an improved means for feeding the couplings into position to be grasped by the chuck and, in turn, applied to the pipe.

A specific object of the present invention is to provide a greatly simplified chuck in which the inertial forces incident to the operation of the chuck to apply the coupling to the pipe are greatly reduced and the resultant stresses imposed on the coupling are limited substantially to those imposed by inertial forces generated of the rotating coupling itself.

A more specific object is to provide a chuck for this purpose of which the body and main bulk are non-rotative, and which includes roller jaws which may be advanced and retracted from a common axis so as to grip pipe couplings of different sizes, and which themselves are individually power rotated about their individual axes while frictionally engaging a coupling so as to frictionally rotate the coupling about the common axis, whereby the inertial forces developed are so predominantly those of the coupling itself that the small inertial forces of the rollers themselves and their driving mechanisms are negligible.

Another specific object is to arrange a chuck in connection with a feed mechanism so that the coupling positioning device of the feed mechanism, which places the coupling in the proper position for engagement by the jaws, can be removed readily radially of the coupling axis while the chuck jaws are in gripping engagement with the coupling.

Other objects are to support the chuck for limited floating movement in a plane normal to the common axis so that it is rendered self centering with respect to the pipe, and counterbalancing the chuck so as to reduce the stresses incident to its shifting for self-centering.

Other objects and advantages will become apparent from the following description wherein reference is made to the drawings, in which:

FIGS. 2 and 3 are left and right end elevations, respectively, of the machine illustrated in FIG. 1, parts thereof being omitted for clearness in illustration;

FIG. 4 is an enlarged fragmentary front elevation, partly in section, of the chuck mechanism with which the present invention is particularly concerned;

FIGS. 5 and 6 are fragmentary right and left end elevations, respectively, partly in section, of the mechanism illustrated in FIG. 4;

FIG. 10 is a front elevation, partly in section, showing the positioning and greasing mechanism for greasing a coupling internally and for positioning the coupling for engagement by the chuck;

FIG. 11 is a left end elevation of the mechanism illustrated in FIG. 10;

FIG. 12 is a front elevation of the feed mechanism by which the couplings from a hopper are fed to the positioning and greasing mechanism;

FIG. 13 is a left end elevation of the mechanism illustrated in FIG. 12;

FIG. 14 is an enlarged fragmentary longitudinal sectional view of the greasing mechanism, part being shown in elevation for clearness in illustration; and FIG. 15 is a schematic illustration of the power operating mechanisms and circuits for effecting the various operations of the machine.

Figure 1:
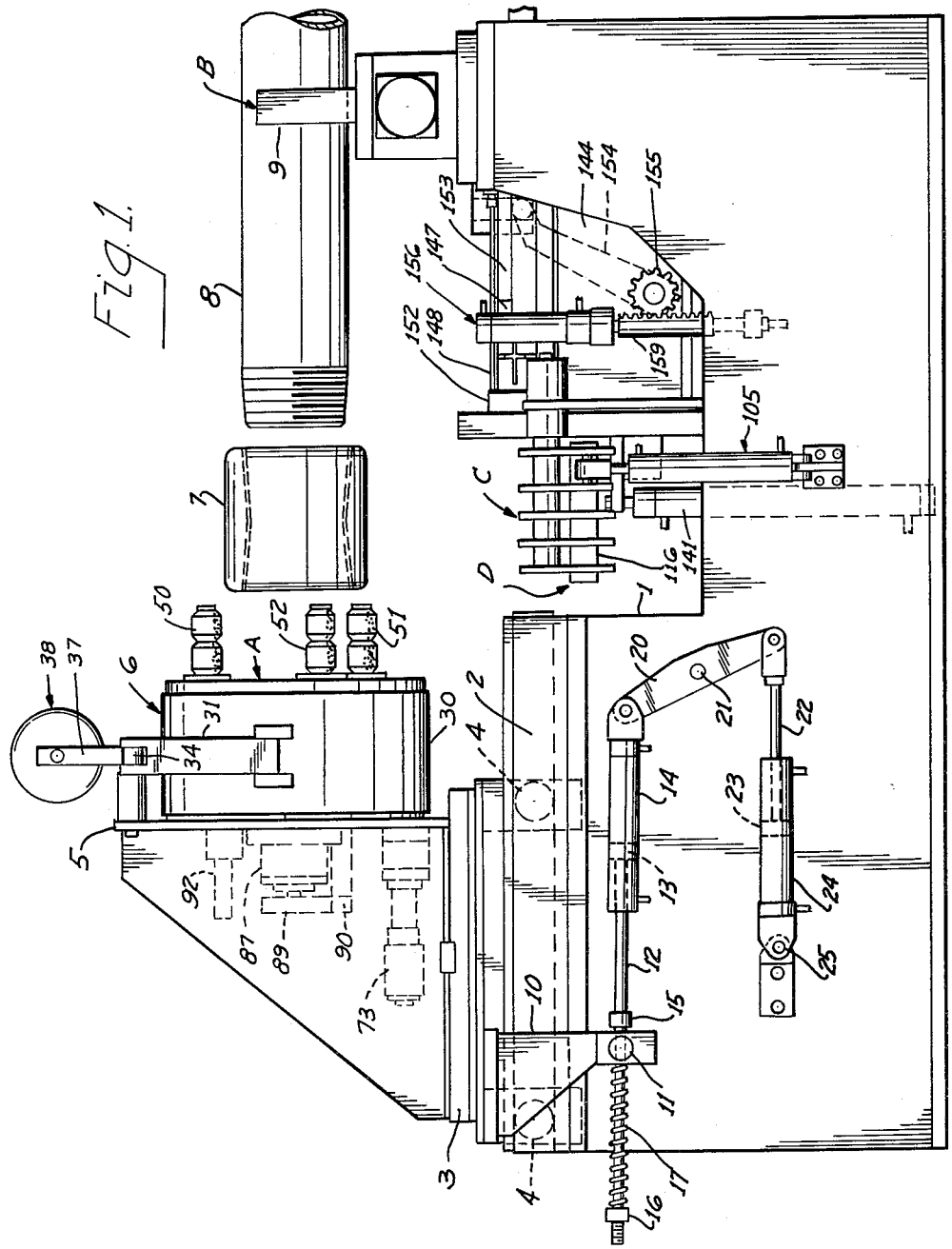
FIG. 1 is a front elevation of a machine embodying the principles of the present invention, and showing the chuck, the feed mechanism, and other mechanism which is utilized preparatory to applying the coupling on the end of a pipe.
Figure 6:
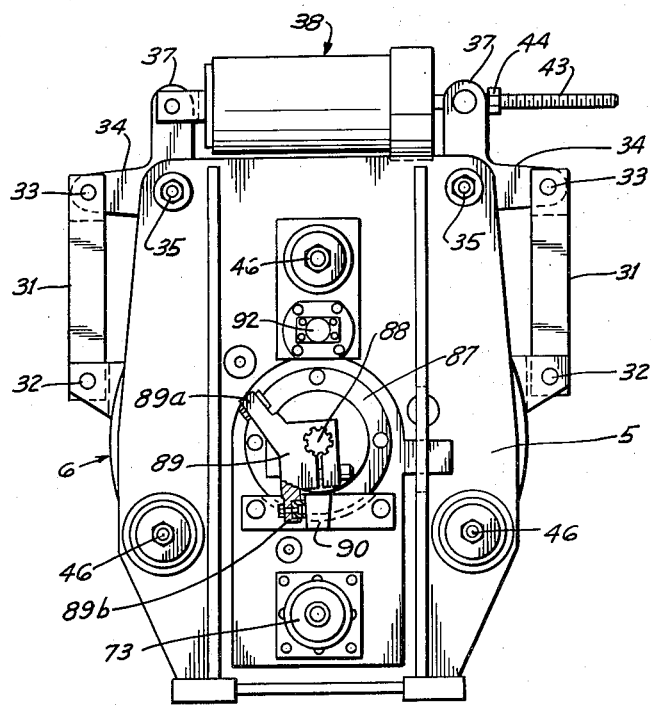

Referring first to FIGS. 1 through 3, the apparatus comprises a coupling rotating chuck mechanism, indicated generally at A, by which a coupling is applied to a pipe; a stationary pipe holding chuck B by which the pipe to which the coupling is to be applied is held in non-rotative condition; a feed mechanism C by which the couplings are fed from a suitable hopper successively; and a hoisting and greasing mechanism D by which the couplings delivered by the feed mechanism C are moved to the position for engagement by the chuck and are internally treated with lubricating and sealing compositions.

In the drawings, the machine is shown as comprising an upright frame 1 the top of which is a suitable horizontal guideway 2. A supporting carriage 3 for the coupling rotating chuck is mounted in the guideway 2 on suitable rollers 4 so that the chuck can be carried thereby parallel to the guideway 2. The carriage 3 has an upright pedestal 5 on which the coupling rotating chuck, indicated generally at 6, is supported with its axis parallel to the guideway 2. Thus the pedestal supports the chuck so that it can be moved axially to engage a coupling, indicated at 7, grip the coupling 7, and move it axially toward and onto the threaded end of a pipe 8 which is held non-rotatively by a suitable chuck 9 in a position very closely coaxial with the coupling 7 when the coupling is accommodated in the chuck 6. The coupling is rotated by the chuck 6 in a manner later to be described as the chuck 6 is advanced toward the pipe 8, thereby screwing the coupling onto the pipe.

For advancing the chuck toward the pipe, the carriage 3 is provided with a dependent arm 10 in which a connector 11 is mounted for oscillation. The connector 11 has a passage extending radially therethrough which slidably accommodates a rod 12 of a piston 13 which is reciprocable in a cylinder 14 of a double-acting hydraulic piston and cylinder assemblage. A stop block 15 is fixed in position on the rod 12 and engages the arm 10 for movement of the chuck to a retracted position as the assemblage is moved to extended position. The rod 12 extends beyond the connector 11 and at its projecting end carries an adjustable abutment 16 in the form of a nut threaded on the rod 12. A suitable compression spring 17 is carried on the rod 12 between the arm 10 and abutment 16. The spring 17 is operable, when the piston 13 is retracted, to urge the carriage 3 yieldably in the direction for loading the chuck and applying the loaded coupling to the pipe. The spring 17 compensates for the difference in the rate of travel of the piston rod 12 and the forward rate of travel of the chuck permitted by the threads of the coupling which it is applying. The spring 17 preferably is of the constant resistance or strength type so that the force at which the chuck is urged toward the pipe may be preselected and maintained.

The head end of the cylinder 14 is pivotally connected to a rocker arm 20 which, in turn, is connected by a pivot 21 to the frame 1. The opposite end of the rocker arm 20 is connected to the rod 22 of a piston 23 which is reciprocable in a cylinder 24 of a reversible hydraulic piston and cylinder assemblage. The head end of the cylinder 24 is pivotally connected to the frame 1 by a pivot 25. By manipulating the pistons 13 and 23 in the proper sequence, the carriage 3, and thereby the chuck 6, may be moved toward the pipe both for loading and for feeding. In the form illustrated, with both pistons extended, the carriage 3 and chuck 6 are fully withdrawn. With the cylinder 24 hydraulically locked, the cylinder 14 may be operated so as to retract its piston 13 thereby advancing the carriage 3 and the chuck 6 to the position in which it can be operated to grip the coupling to be applied. Thereupon, with the piston 13 in fully retracted position, the cylinder 24 is operated so as to retract the piston 23, thus advancing the carriage 3 and the chuck 6 farther in the direction toward the pipe during the application of the coupling 7 to the pipe 8. During the application, the spring 17 is operable to advance the chuck 6 in the direction toward the pipe yieldably so as not to advance the coupling at a greater rate than is permitted by the threads at the speed of rotation of the coupling.

Referring next to the chuck 6, with which the invention is particularly concerned, the chuck comprises a floating body 30 which, as best illustrated in FIGS. 4 and 5, is suspended from the pedestal 5 by means of pivoted links 31 arranged one link at each side of the body 30. The links are pivotally connected to the body by pivots 32 which are parallel to the common axis of the chuck 6 and pipe 8. The upper ends of the links 31 are connected by pivots 33 to rocker arms 34, respectively, the rocker arms 34, in turn, are pivotally connected to the pedestal 5 by pivots 35. Each of the arms 34 has an inward extension 34a which is disposed between the pivots 35 and the inner ends of which are in the form of gear segments 36. The segments 36 are in mesh with each other so that, during rocking of the arms 34, the pivots 33 are constrained to rise and fall exactly the same distance concurrently.

Since the chuck body 30 and the operating mechanisms carried thereby are relatively heavy, it is desirable that they be counterbalanced. For this purpose, each of the arms 34 is provided with an integral upstanding arm 37. The arms 37, in turn, are connected to a counterbalance, indicated generally at 38. The counterbalance 38 comprises a cylinder 39 pivotally connected at one end to one of the arms 37. A piston 40 is reciprocable in the cylinder and has a piston rod 41 connected to the other of the arms 37. A spring 42 is interposed between the piston and the rod end of the cylinder 39. The piston rod 41 extends beyond the arm 37 and is threaded, as indicated at 43, for accommodating a nut 44 which provides an adjustable abutment engageable with the arm for varying the applied force of the spring, thus adjusting the counterbalance in accordance with the weight of the coupling which is to be applied. By this arrangement, the chuck 6 is supported so that it can be readily moved slightly vertically and can be readily swung slightly to the right or left. Thus it is mounted for limited floating movement relative to the pedestal in a plane normal to the axis of the pipe. As a result, should the end of the pipe be slightly out of position due to curvature of the pipe and the like, the chuck 6 can accommodate itself and become coaxial with the pipe. Since the chuck 6 is relatively heavy, it is held in position on the pedestal 1 for its limited floating movement in the plane of the pedestal antifrictionally.

As illustrated best in FIG. 4, the chuck 6 is mounted on posts or rods 46 each of which carries one plate 47 of an antifriction thrust bearing, the other plate 48 of which is secured to the pedestal 5. As a result, the chuck 6 is held with its axis horizontal and parallel to the pipe axis at all times, yet is freely movable while its axis remains parallel to its original position.

Figure 9:
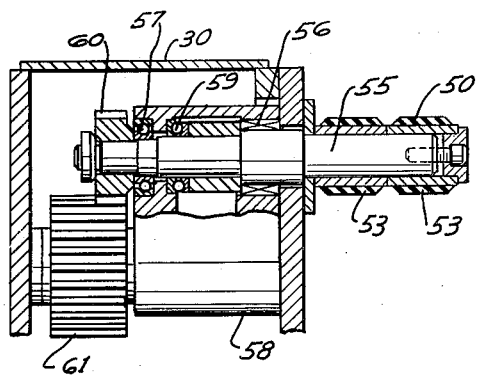
FIG. 9 is a fragmentary sectional view taken on line 9—9 of FIG. 7.
Figure 7:
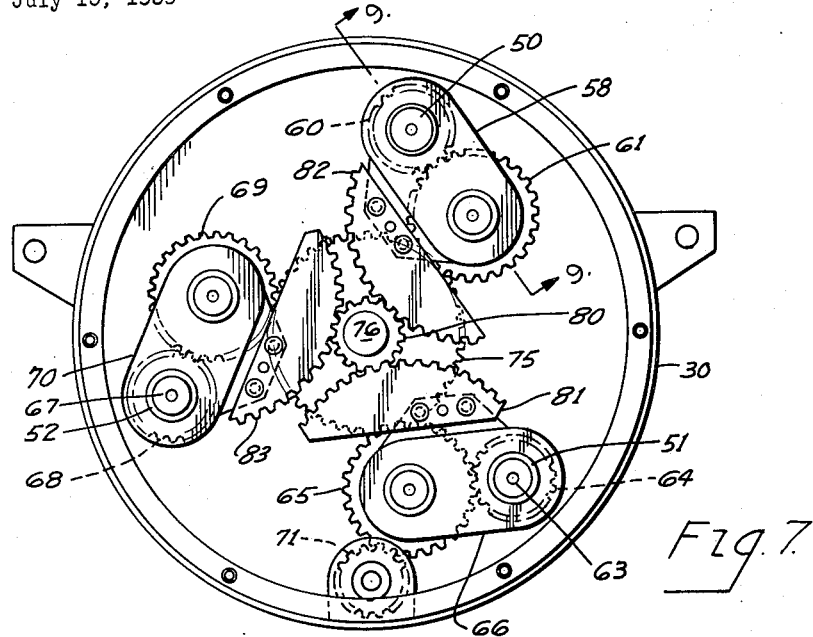
FIG. 7 is a right end elevation, partly in section, of the chuck illustrated in FIG. 4.
Figure 8:
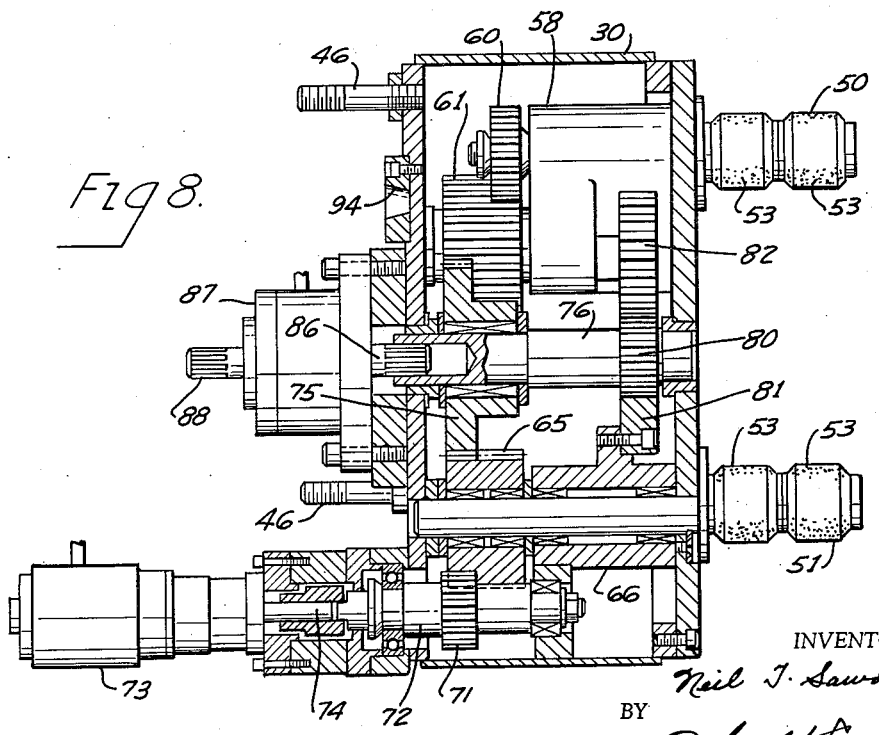
FIG. 8 is a vertical cross sectional view taken on the line 8—8 of FIG. 5.

As mentioned hereinbefore, the chuck 6 is non-rotatable in and of itself. It is provided with roller jaws which are individually rotatable about respective axes parallel to a common axis. A plurality of such roller jaws are provided, but for purposes of illustration three are shown, these being indicated at 50, 51 and 52, respectively. Each of the jaws is in the form of a roller with its axis parallel to the axis of the chuck, and each has a wear resistant tire 53 of resilient friction material. As best illustrated in FIG. 9, a fragmentary sectional view of the roller jaw 50, which is typical of all of the roller jaws, is illustrated. The roller jaw 50 is mounted on a shaft 55 for rotation therewith, and the shaft 55 is mounted in suitable antifriction bearings 56 and 57 in a carrier 58. Suitable thrust bearings 59 are provided for assuring the proper position of the rollers axially. Mounted on the inner end of the shaft 55 for rotation therewith is a suitable gear 60 which is in continuous mesh with a transmission gear 61. The gear 61 is rotatably mounted on the carriage 58.

The roller 51 likewise is provided with a shaft 63 on which is fixedly mounted a gear 64 driven by a transmission gear 65 which is rotatably mounted on a carrier 66 corresponding to the gear 61 and carrier 58 of the roller 50. The roller 52 is provided with a shaft 67 which carries a gear 68 driven by a gear 69 mounted on the carrier 70. The gear transmission 65 is driven directly by a gear 71 which is securely mounted on, and for rotation with, a shaft 72 rotatably supported in the body 30 of the chuck 6. The shaft 72, in turn, is driven by a motor 73 having a shaft 74 coaxial with, and drivingly connected to, the shaft 72. The motor 73 is air driven so that, should the rollers 50, 51 and 52 meet too heavy a resistance, they can arrest operation of the motor instead of jamming the threads.

The gear 65 is in mesh with a common transmission gear 75 which is rotatably mounted on a shaft 76 coaxial with the chuck. The gear 75, in turn, is in mesh with the gears 61 and 69. Since the gears 65, 61 and 69 are all of the same diameter, as also are the gears 60, 64 and 68, all of the rollers are driven at the same speed concurrently.

It is desirable, however, that the roller jaws be advanced and retracted concurrenly and equidistantly. For this purpose, the shaft 76 is rotatably mounted in the body or housing 6 and is provided with a common driving gear 80. The carriers 58, 66 and 70 are provided with suitable gear segments 81, 82, and 83, respectively, each of which is coaxial with the axes of rotation of its gears 61, 65 and 69, respectively. These gear segments are in mesh with the common driving gear 80. Accordingly, upon rotation of the gear 80, each of the segments is rotated about the axis of the associated one of its gears 61, 65 and 69. As a result, the roller jaws 50 remain in mesh with the gears 60, 64 and 68 carried by their associated carriers driven by the common gear 75, and, at the same time, all of the carriers are oscillated the same distance about the axis of their respective driving gears, which axes are eccentric to, and equidistant from, the axes of the roller jaws themselves. Suitable slots 85 are provided in the front wall of the chuck body 30 for permitting the oscillatory movement of the shafts of the roller jaws.

For oscillating the carriers 58, 66 and 70, shaft 76 is drivingly connected to the shaft 86 of a motor 87 which preferably is a hydraulically driven motor. In order to limit the oscillation of the shaft 76, and therefore the movement of the jaws 50, 51, and 52 to advanced and retracted positions, and to prevent the shafts of the jaws from striking the ends of the slots, the extent to which the motor can oscillate is limited. This is accomplished by extending the shaft 86 of the motor 87 to the outside of the motor casing so as to provide a splined extension 88 on which is secured a suitable stop 89. The stop 89 has stop shoulders 89a and 89b arranged so that, upon rotation of the motor in opposite directions, they engage stop 90 on the body 30. The position of the shoulders 89a and 89b are so chosen relative to the stop 90 that the roller jaw shafts can move from one end of the slots 85 to the opposite ends of the slots 85 without engaging the ends of the slots. The shoulders are so positioned circumferentially of the shaft of the motor 86 depending on the extent of travel of the jaw shafts desired.

As a result of the structure described, it is apparent that the roller jaws are concurrently rotated about their respective axes parallel to the common axis of the chuck, and also are concurrently moved equidistantly toward and away from the common axis of the chuck to preselected positions, depending upon the coupling diameter.

Assuming that a coupling 7 to be applied to the pipe 8 is supported in substantially coaxial relation to the chuck, all that is necessary is to advance the chuck toward the coupling, with the roller jaws 50, 51 and 52 in sufficiently retracted position from the coupling axis so as to pass axially of the coupling 7 along paths slightly outwardly from the outer periphery thereof, until the end of the coupling 7 adjacent the chuck 6 is substantially at the axial limits of the roller jaws nearest the front wall of the chuck. Thereupon, the roller jaws are advanced toward their common axis concurrently and frictionally grip and hold the coupling 7. As soon as support for the coupling is removed, they can begin rotation for frictionally rotating the coupling about the common axis.

In order to supply pipe couplings to the proper location for engagement by the chuck, the structure now to be described is provided.

It is desirable that the coupling be positioned substantially coaxial with the chuck which is substantially coaxial with the pipe, that it be held in that position in spaced relation endwise between the ends of the roller jaws 50, 51 and 52 of the chuck 6 and the end of the pipe 8, so that, as the chuck is advanced toward the pipe, it first engages the coupling 7, then grips it, and begins to rotate it, continuing the rotation while advancing the coupling farther in the direction toward the pipe and thus starting the coupling 7 on the pipe.

The slight limited counterbalanced floating movement of the chuck 6 combined with the force of the spring 17 urging the chuck 6 toward the pipe 8, causes the coupling to become coaxial with the pipe and start on the pipe properly.

In order to hold the chuck in coaxial position with the coupling while the coupling is supported preparatory to and during initial engagement of the rollers therewith, a suitable centering device is provided. This device comprises a piston rod 91 of a reversible hydraulic or pneumatic piston and cylinder assemblage 92. The forward end of the piston rod is tapered, as indicated at 93, and is engageable with a suitable tapered aperture 94 in the rear wall of the chuck body 30. Thus, during normal operation and preparatory to releasing the chuck for self centering on the pipe, pressure fluid is admitted to the head end of the assemblage 92 and thereby advances the piston rod 91 into the hole or aperture 94, thereby moving the chuck in a plane normal to the chuck axis to the proper centered position so that it is coaxial with the coupling 7 when the coupling 7 is held in the proper loading position.

Referring next to the means for moving the coupling to loading position, a suitable structure therefor is illustrated in FIGS. 12 and 13. As there illustrated, a chute 100 is provided which extends laterally from the common axis of the chuck roller jaws and is inclined so that the couplings 7 can roll downwardly toward the common axis. At the lower end of the chute is a suitable feed mechanism which may comprise a plurality of disc segments 101 arranged on a common shaft 102 for rotation about an axis parallel to the pipe axis. Each of the discs has a suitable cutout 103 which, in the normal blocking position of the trough, is disposed upwardly, as illustrated in FIG. 13, and has a leading edge portion 103a which normally is substantially tangential to the bottom or base of the chute 100, and an abutment portion 103b which normally is upright and prevents the couplings 7 from rolling out of the end of the chute.

In the position shown in FIG. 13, the couplings roll down the chute and assume the position in which they are blocked at the lower end thereof by the portion 103b and are supported on the portion 103a.

The discs 101 are co-rotatable with, and connected together for rotation about, the shaft 102 and are rotated by means of a reversible hydraulic piston and cylinder assemblage 105 including a cylinder 106 and a piston 107 having a piston rod 108. At its upper end, the rod 108 is pivotally connected to the discs by a pivot 109. Thus, by operating the assemblage 105 to extend the piston, the surface 103b is swung counterclockwise in FIG. 13 to permit a coupling 7 to roll downwardly therefrom, and, at the same time, the peripheral surface, indicated at 110, of the discs blocks the next successive coupling from rolling out of the end of the chute. When the discs have rotated sufficiently to discharge a coupling 7, it rolls downwardly along a guide 115—which is adjustable to different positions so that it can accommodate couplings of different diameters—into a suitable positioning device or trough 116 which supports the coupling with its axis parallel to the common axis of chuck 6 and the pipe 8, and which, as will later be described, is moved vertically to the proper position to cause the axis of the coupling to be coaxial with the common axis of the roller jaws of the chuck.

Since the different diameter couplings are to be handled, the guide 115 is made adjustable vertically and correspondingly is supplemented by guide 117 which can be moved while remaining in proper relation to the guide 115 so as to assure that the coupling will be properly positioned in the device 116.

For example, referring to FIG. 13, assuming that the coupling 7 is to be fed, the guides 115 and 117, and the device 116 are in the full-line positions shown in FIG. 13. If a coupling of a smaller diameter, such as indicated at 7', is to be fed, then the guides 115 and 117 are adjusted to the dotted positions 115' and 117', whereupon a narrower device 116 is lifted to a proper position and passes between the inner ends of the guides 115' and 117'. For this purpose, the original trough or device 116 for the size of coupling indicated at 7 is removed from its support and a smaller trough of lesser width for accommodating the coupling 7' is substituted.

In order to adjust the guides 115 and 117 while retaining them parallel to their original positions, they are mounted on arms 119 and 121, respectively. The arms 119 are pivotally connected to suitable links 122 and 123, respectively, which, in turn, are pivotally connected by pivots 124 and 125 to a suitable supporting plate 126. At their lower ends, the arms 119 and 121 are connected to links 128 and 129, respectively, which, in turn, are pivotally connected to the plate 126. The link 128 carries a crank arm 130 which is pivotally connected to a suitable follower 131 operable by a jack screw 132 having a crank accommodating end 133. By rotation of the screw 132, the crank arm 131 can be swung to the right or left about the axis of the pivot connecting the link 128 to the plate 126. The links 122 and 123 are provided with gears 135 and 136, respectively, which are non-rotative relative to the links 122 and 123 and are rotatable with the links about the axes of the pivots 124 and 125. These gears are intermeshed so as to constrain the two links 122 and 123, and thereby the arms 119 and 121, to move vertically at exactly the same rate and to approach inwardly toward the axis of the pipe at exactly the same rate. As a result, upon operation of the jack screw 132 by the crank 133, the guides 115 and 117 can be moved from the position shown in full lines in FIG. 13, to their uppermost position, indicated at 115' and 117', while remaining at all times parallel to their original positions, respectively, and while spaced proportionally the same distances outwardly from the axis of the pipe. Any other means desired for feeding the couplings to the positioning device 116 may be used.

The positioning device or trough 116 is mounted on a vertically movable slide 140 which is movable to different elevations by a reversible hydraulic piston and cylinder assemblage 141 of which the piston rod 142 is connected to the slide.

Before applying couplings to pipes, it is desirable to apply lubricants and sealing compounds to the interior of the coupling. For this purpose, the slide 140 is provided with a rearward extension 144 on which is carried a mechanism for applying the lubricant and compound. In the form illustrated, this mechanism comprises a disc 145 mounted on, and for rotation with, a rotatable shaft 146 which is driven by a suitable hydraulic motor 147, the disc being arranged with its axis of rotation parallel to the coupling axis. A tube 148 connected to a suitable source 149 of lubricant and compound under pressure through a remote control valve 150, is used to supply lubricant and compound under pressure into an annular passage 151 in a housing 152 and to cause discharge thereof through ports 152a against the rear face of the disc. Thus, the material supplied through the tube 148 is applied by centrifugal force, imparted by the disc, to the interior of the coupling. However, this requires that the disc and the mechanism for operating it be advanced and retracted so that it can pass for the full length through the coupling and be fully retracted therefrom. For this purpose, the housing 152 is mounted on a suitable slide 153 which moves parallel to the axis of the tube. The slide is connected by means of a rocker arm 154 to an oscillating gear 155 so that, upon oscillation of the gear, the slide and thereby the disc 145 are advanced and retracted. For oscillating the gear 155, a suitable piston and cylinder assemblage 156 is mounted on the extension 144, this assemblage including a cylinder 157 and a piston having a rod 158 to which is connected a suitable rack 159 for movement parallel to the axis of the piston. The rack 159 is maintained in continuous engagement with the gear 155, whereby, upon extension of the piston and cylinder assemblage 156, the disc 145 is moved into the coupling 7 to a fully extended position and, upon retraction of the piston and cylinder assemblage 156, the disc is fully retracted from the interior of the coupling.

The positioning device 116 normally occupies a position below that at which the coupling is to be held for engagement by the chuck roller jaws. It is moved upwardly by the operation of the assemblage 141 to position it in the proper position. Usually, before so doing, the assemblage 156 and valve 150 are operated to apply the lubricant, after which both the device 116 and the mechanism for applying the lubricant are lowered out of the way so as not to interfere with the advance of the chuck 6 toward the pipe 8 for applying the coupling 7 to the pipe.

As mentioned hereinbefore, the roller jaws 50, 51 and 52 of the chuck 6 are so arranged that the device 116 can pass upwardly between the two lowermost jaws 51 and 52. As a result, the coupling can be lifted by the device 116 into concentricity with the chuck, the chuck advanced axially, the jaws 50, 51 and 52 advanced toward the axis of the coupling to grip the coupling and hold it in concentric relation to the chuck. While held in this position, and before the chuck is advanced to the pipe, the device 116 is lowered from between the two lowermost jaws 51 and 52, thus leaving the coupling supported solely by the chuck roller jaws.

Thereupon, the motor 73 is actuated to rotate the roller jaws and thereby frictionally rotate the coupling about its own axis, which also is the instantaneous axis of the chuck. This rotation continues as the chuck is advanced toward the pipe, as hereinbefore described.

Referring next to the schematic drawing, it is to be noted that the various motors, both hydraulic and air, are arranged so that they can be remotely controlled by suitable solenoid operated valves, as a result of which they can readily be timed so that the machine can operate automatically. Any suitable timing mechanism, of course, can be utilized for this purpose since the valves are solenoid controlled and the specific timing mechanism is not a part of the present invention. For operating the various motors, suitable fluid power supply means are provided. For operating the air motor 73, a suitable motor-driven pump 160 is connected thereto through a reversing valve 161 which is solenoid operated and as the result of which the motor 73 can be driven in either direction or the air supply thereto discontinued while the supply pump continues operation.

The motor 87 is hydraulically operated and is controlled through a suitable solenoid operated reversing and cutoff valve 162 which is interposed between the motor 87 and the opposite sides of a hydraulic fluid pressure supply circuit. In the form illustrated, the hydraulic fluid pressure is supplied by a pump 163 to a pressure line 164. The pump and the return line 165 are vented to a common sump S. Since the pressure of the air supplied to the motor 73 can be accurately controlled and the pressure supplied to the motor 87 is predetermined, the torque that can be exerted by the roller jaws 50, 51 and 52 on the coupling is readily controlled, the frictional drive being controlled by controlling of the air pressure supplied the pump 73 and the radial pressure being controlled by the control of the motor 87. If desired, any conventional adjustable constant pressure control may be interposed between the valve 162 and the motor 87. This is true in all instances in which it is desired to have a lower pressure than the normal feed line pressure.

In order to advance and retract the chuck 6 by rocking the arm 20, hydraulic pressure is supplied to the cylinder 14 through a suitable solenoid operated reversing and cutoff valve 167 from the lines 164 and 165. The valve 167 is arranged to connect the cylinder at opposite sides of the piston with the fluid circuit, and to reverse the connection when desired.

Correspondingly, the cylinder 24 is connected to the lines 164 and 165 through a solenoid operated reversing and cutoff valve 168. The piston and cylinder assemblage 141 is arranged with its cylinder connected at opposite sides of the piston to the supply line through a solenoid operated reversing and cutoff valve 169. The assemblage 105 is similarly connected to the feed line through a solenoid operated reversing and cutoff valve 170. The motor 147 is connected for hydraulic drive through a solenoid operated reversing and cutoff valve 171. The assemblage 156 is controlled by a solenoid operated reversing and cutoff valve 172.

As illustrative of the operation of the device, without necessarily utilizing an automatic control, the valve 170 is operated so as to cause operation of the assemblage 105 from moving the feed discs 101 to position to permit a coupling 7 to roll down its chute 100 onto the positioning device 116. While the coupling is supported on the device 116, the valve 170 may be operated to operate the assemblage 156 and thereby cause the greaser disc 145 to project into and retract from the coupling supported on the support 116. During this operation, the valve 150 is opened and the valve 171 is operated so as to cause rotation of the motor 147. As a result, the lubricant and coating material to be applied to the interior of the coupling is projected against the disc and thrown outward therefrom by centrifugal force. During traverse of the disc along the coupling, the composition is applied uniformly along the length of the coupling. After greasing of the coupling, the valve 169 is operated to operate the assemblage 141 and position the device 116 so that the coupling is in a position to be grasped by the chuck roller jaws 50, 51 and 52. While the coupling is so held by the device 116, the valve 167 is operated to retract the cylinders 14 and thus compress the spring 17 and urge the carriage 3, and thereby the chuck 6, forwardly toward the supported coupling. This operation continues until the roller jaws 50, 51 and 52 of the chuck, which have been moved to retracted position by the motor 87 under the control of the valve 162, pass the adjacent end of the supported coupling 7. Thereupon, the valve 162 is operated to control the motor 87 to cause the jaws to advance toward the axis of the coupling, thereby grip the coupling and hold it in coaxial relation to the chuck axis. During this period, the chuck has been held in proper centered position by means of the piston and cylinder assemblage 92. After the jaws 50, 51 and 52 have gripped the coupling, the valve 169 is operated to control the assemblage 141 and lower the positioning device 116 downward between the jaws 51 and 52, out of the path of the chuck. This also lowers the supporting portion 144 and the grease and composition applying mechanism.

The discharge discs 110 are always below the level of the chuck path and the device 116 is lowered to receive the next coupling. Thereafter, the valve 168 is operated to cause the piston 23 to retract and further move the chuck 6 forwardly yieldably toward the pipe 8. At the same time, the valve 161 is operated to admit air to the motor 73 so that the jaws are rotatably driven and therefore initiate, and continue the rotation of the coupling, about its own axis while the chuck is non-rotative. The advance of the chuck continues until the coupling is engaged to the pipe and thereupon the valve 173 is operated to operate the cylinder 92 to release the centering mechanism and allow the chuck and coupling to accommodate themselves and become self aligning with respect to the pipe, thus compensating for slight eccentricity between the normal centered position of the chuck and the end of the pipe. Thereupon, since the spring 17 is yieldably urging the chuck in a direction for applying the coupling, even though the driving forces now applied by the piston 23 would otherwise advance the chuck at a different rate, the chuck advances at the rate commensurate only with the advance permitted by the threads at the preselected speed of coupling rotation, without undue frictional or binding stresses between the threads of the coupling and the pipe. This continues until the coupling is fully applied, whereupon the roller jaws 50, 51 and 52 tend to slip so as not to overtighten or jam the threads.

The inertial forces applied to the threads are substantially only those generated by the rotation of the coupling itself, as the roller jaws and the operating mechanisms therefor are quite small and the inertial forces they add are negligible compared to those due to the rotating coupling.

As soon as the coupling is applied, the valve 162 is operated to cause operation of the motor 87 to retract the jaws outwardly from the axis of the coupling and release the coupling.

At the same time, if desired, the valve 161 may be operated to stop the rotation of the roller jaws. Next, the valves 167 and 168 are operated to retract the chuck 6 to its starting position in which it is ready to repeat the operation. During this time, the valve 173 may be operated so that the counter-balanced chuck is again brought accurately to center by the operation of the assemblage piston rod 91. Next, the valve 170 is operated to feed another coupling onto the now lowered positioning device 116, which is then elevated to the position for loading the chuck. The coupling is coated with lubricant, and the operation can be repeated, a new pipe meanwhile having been placed in the pipe chuck 9.

The specific order of lubricating, lifting, and the like, and the starting and stopping of the rollers is not in all respects important, but the operation described above is one which is satisfactory. Variations in order may be made therein to suit the needs of a particular job.

Having thus described my invention, I claim:

1. A chuck including a body, a plurality of jaw carriers, at least three in number, carried thereby and spaced about a common axis which is in fixed position relative to the body, roller jaws mounted on the carriers, respectively, and supported thereby in spaced relation to each other about, and with their axes parallel to, said fixed common axis, each roller jaw for rotation about its individual axis, means movably connecting every one of the carriers to the body for concurrent movements which effect concurrent and equal movement of the jaws toward, and concurrent and equal movement of the jaws away from, said fixed common axis, selectively, while maintaining their axes equidistant from said fixed common axis, said body being free from roller jaws which are a fixed distance from said fixed common axis, drive means for effecting said concurrent movements of the carriers, power means for rotating at least one of the jaws about its individual axis, and said jaws having their peripheral surfaces configured to engage a cylindrical member and support it in fixed position axially of the jaws during rotation of the jaws about their respective axes.

2. The apparatus as defined in claim 1 wherein the first mentioned means support the carriers for oscillation toward and away from said common axis about axes, respectively, which are in fixed position on the body and are distributed uniformly about, and spaced equidistantly from, said common axis, said drive means include a common driving means carried by the body, and driven means drivingly connecting the carriers to the common driving means for concurrent oscillation thereby, each roller jaw is mounted on its associated carrier with its axis offset from the axis of oscillation of its associated carrier, and the axes of the roller jaws are equidistant from the axes of oscillation of their associated carriers.

3. The apparatus as defined in claim 2 wherein the driven means includes driven members fixedly secured on the carriers, respectively, for rotation therewith about the axis of oscillation of its associated carrier, and the common driving means includes a rotatable driving member coaxial with the common axis, and drivingly connected to all of the members.

4. The apparatus according to claim 3 wherein the common driving member is a shaft rotatably mounted in the body and coaxial with the common axis, a coaxial driving gear thereon, said drive means includes means to oscillate the shaft about its axis, the power means includes a rotatable transmission gear mounted on the shaft for rotation relative thereto, driven gears mounted on the carriers, respectively, each for rotation relative to its associated carrier about the oscillating axis of its associated carrier and in driving relation to said rotatable transmission gear, a primary driving gear drivingly connected to one of said gears, and a motor carried by the body and drivingly connected to the primary driving gear.

5. The structure according to claim 1 wherein said power means is drivingly connected to each of said roller jaws and is operable to drive all of them rotatably concurrently.

6. A device for applying an annular threaded member to a complementary threaded object, including a chuck having a body, a plurality of roller jaws mounted on the body in spaced relation to each other about, and spaced from, a common axis for movement concurrently into member holding position, and concurrently out of said position, and for rotation about individual axes, respectively, means to effect said movement and rotation, power means carried by the body for driving at least one of the jaws rotatably about its axis, the peripheral surfaces of the jaws being positioned to engage frictionally, at circumferentially spaced locations, the peripheral surface of an annular member, and to support the member in coaxial relation to, and in fixed position axially of, said common axis, and frictionally to rotate the member about said common axis when the member is so engaged, an additional chuck operable to hold a cylindrical object in coaxial relation with said common axis, means supporting the chucks for relative movement of the chucks axially toward and away from each other, and chuck advancing and retracting means for effecting said relative movement.

7. The structure according to claim 6 and additionally including a positioning device including a movable support for supporting the annular member to be gripped by the applying chuck, means for moving the support transversely of the jaws and common axis between and past a pair of adjacent jaws toward the axis so that the annular member can be engaged and held by the jaws, and to retract the support, transversely of the jaws and common axis, between and past said jaws in a direction away from the axis.

8. The structure according to claim 7 including additionally a movable platform for, and movable with, said support, a greaser means supporting a greaser on the platform support for advancement of the greaser axially of the chuck to a position for applying grease to the interior of the annular member supported by the annular member support and for retraction from grease applying position, and additionally for movement transversely of the common axis from the space between the chucks concurrently with the movement of the support from said space.

9. The structure according to claim 6 including, in addition, a chuck support for the applying chuck and movable parallel to said common axis, means connecting the body to the chuck support for limited movement of the body transversely of the common axis while constraining it to positions wherein the roller jaw axes are parallel to the common axis.

10. The structure according to claim 9 including additionally centering and holding means for moving the body transversely of the common axis into, and holding the body in, a position in which the common axis is coincident with a true cylindrical object held in the additional chuck and for releasing the body for permitting the chuck to float parallel to its centered position transversely of the common axis so that the engaging ends of the cylindrical object and annular member self adjust themselves to bring their threads into coaxial relation, thereby compensating for slight inaccuracies in the coaxial relation to their adjacent ends.

11. In combination, a chuck including a non-rotatable chuck body, individually rotatable radially spaced parallel roller jaws carried thereby each rotatable about its individual axis, said axes being parallel to each other, a pipe chuck, said chucks being operable to support cylindrical members, respectively, in coaxial relation to each other, means for moving the chucks axially relatively toward and away from each other, a positioning device movable laterally of the jaws from a receiving position wherein it supports one of the cylindrical members offset entirely from the position in which said one member is disposed when in said coaxial relation to a chuck loading position between the chucks in which said one member is in said coaxial relation to a chuck loading position between the chucks in which said one member is in said coaxial relation, means to feed cylindrical members one at a time onto the device while the device is in the receiving position, means for arresting the feed, and moving means for moving the device laterally of the jaws into and out of the chuck loading position.

References Cited in the file of this patent
UNITED STATES PATENTS

| 1,541,874 | Thompson et al. | June 16, 1925 |
| 1,765,825 | Cork | June 24, 1930 |
| 1,976,155 | Bebie et al. | Oct. 9, 1934 |